(No Model.)
L. G. FATH.
Cultivator.
No. 234,973. Patented Nov. 30, 1880.
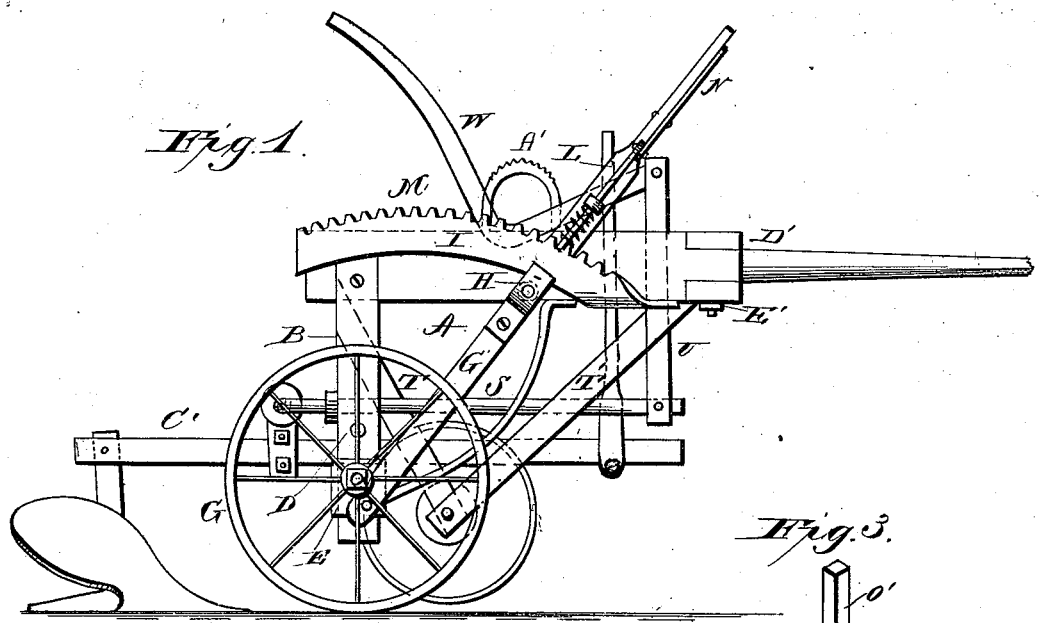
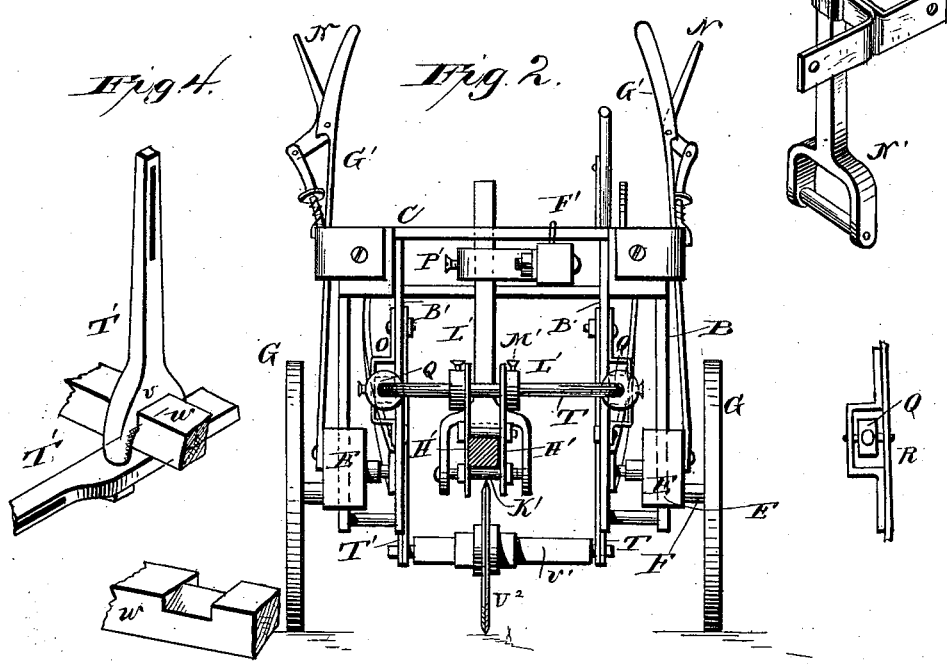
Witnesses.
Franck L. Ourand.
J. J. McCarthy.
Inventor,
L. G. Fath.
By Alexander Mason
Atty.

UNITED STATES PATENT OFFICE.

LEONARD G. FATH, OF HILLSBOROUGH, ILLINOIS.

CULTIVATOR.

SPECIFICATION forming part of Letters Patent No. 234,973, dated November 30, 1880.

Application filed September 6, 1880. (No model.)

*To all whom it may concern:*

Be it known that I, LEONARD G. FATH, of Hillsborough, in the county of Montgomery, and in the State of Illinois, have invented certain new and useful Improvements in Plow-Sulky, Stalk-Cutter, and Cultivator Attachments; and I do hereby declare that the following is a full, clear, and exact description thereof, reference being had to the accompanying drawings, and to the letters of reference marked thereon, making a part of this specification.

This invention relates to certain improvements in cultivators; and it has for its objects to provide an improved means of elevating and depressing the main frame upon the wheels, and elevating and depressing the plow-beam in the frame, so as to set the plow to or withdraw it from its work, and to provide an improved means of attachment whereby plow-beams of different lengths may be employed at will, and for attaching a stalk cutter or cutters to the apparatus when desired. These objects I accomplish by means of the apparatus illustrated in the accompanying drawings, in which—

Figure 1 indicates a side elevation of my improved cultivator; Fig. 2, a rear elevation of the same, and Figs. 3 and 4 perspective views of detached parts.

The letter A indicates the frame of my improved cultivator, consisting of the uprights B B' and the horizontal beams C.

The uprights B are provided with equidistant apertures D, and each is provided with a vertically-sliding block, E, from which project outwardly the spindles F for the wheels G, upon which the cultivator is designed to travel. To said blocks are secured, at their lower ends, the levers G', which are provided with friction-rollers H, which bear against the lower curved sides of the segments I, forming movable fulcrums for said levers, whereby the levers, when operated, elevate or depress the blocks, and thus elevate or depress the frame upon the wheels. Each lever G' is provided with a spring-detent, L, adapted to engage ratchet-teeth M at the upper edge of the segments, to hold the levers in any desired position, the detents being operated to release the levers by means of the supplementary levers N.

To the uprights B' are secured the braces O, and said uprights and braces are provided with apertures, which serve as bearings for the journals of the swivel-blocks Q, which are provided with transverse apertures R, through which the sides S of the bail T pass, and in which said sides set loosely, so as to be capable of a longitudinal movement therein. One side of the bail extends forward, and has pivoted to its extremity one end of a link, U, the other end of which is pivoted to an angle-lever, W, fulcrumed to the frame A. The said lever is provided with a detent adapted to engage a ratchet, A', whereby it may be retained in any desired position.

It will be seen that as the lever is operated a longitudinal as well as oscillating motion is given to the bail, causing the same to recede just before being elevated, so as to clear the plow which is secured to the beam C' from the furrow, remove the soil, and then permit it to be freely elevated as the bail is oscillated to raise the beam.

The letter D' indicates the draft-beam of the cultivator, pivoted to the forward part of the frame at E', and extending to the rear, where it is confined loosely by means of a bent connection, F', embracing the rear horizontal beam of the frame.

The letter C' indicates the plow-beam, which is secured to the bail T by means of the clamps H' and screws and bolts K'. The said clamps are secured to the bail by means of collars L', having set-screws M'. The forward end of the plow-beam sets loosely in a stirrup, N', at the lower end of a vertical rod, O', which is confined adjustably, by means of a set-screw, P', in a socket, R', formed in a T-plate, S', secured to the draft-beam.

The letter T' indicates two braces attached at each side to the frame A, and provided with apertures at their extremities, in which are journaled the ends of a shaft, U', upon which are mounted one or more stalk-cutters, $V^2$.

In Fig. 4 a modification of the braces is shown, the ends of the braces being slotted for attachment to the frame, one brace being bifurcated, as shown at v, and secured to the other brace, so as to confine thereto a block, w, which forms bearings for the journal of the stalk-cutter shaft.

Having thus described my invention, what I claim, and desire to secure by Letters Patent, is—

1. In combination with the uprights of the frame of the cultivator, the sliding blocks mounted thereon and provided with spindles for the wheels, and the levers pivoted thereto, provided with friction-rollers working under segments secured to the sides of the frame, substantially as specified.

2. In combination with the frame of a cultivator, the bail for supporting the plow-beam, the said bail being loosely secured in swivel-blocks journaled in bearings in the uprights of the frame, and the lever for operating the said bail, whereby a longitudinal as well as oscillating movement may be given to the bail, substantially as and for the purposes specified.

In testimony that I claim the foregoing I have hereunto set my hand this 30th day of August, 1880.

LEONARD G. FATH.

Witnesses:
WILL S. CRESS,
CHARLEY D. MARSHALL.